US012444149B2

(12) United States Patent
Yokokawa et al.

(10) Patent No.: US 12,444,149 B2
(45) Date of Patent: Oct. 14, 2025

(54) CONTENT TRANSFORMATIONS BASED ON REFLECTIVE OBJECT RECOGNITION

(71) Applicant: Apple Inc., Cupertino, CA (US)

(72) Inventors: Yutaka Yokokawa, Los Gatos, CA (US); Devin W. Chalmers, Oakland, CA (US); Brian W. Temple, Santa Clara, CA (US); Rahul Nair, Hayward, CA (US); Thomas G. Salter, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/829,450

(22) Filed: Sep. 10, 2024

(65) Prior Publication Data
US 2025/0005873 A1 Jan. 2, 2025

Related U.S. Application Data

(63) Continuation of application No. 18/214,575, filed on Jun. 27, 2023, now Pat. No. 12,112,441.
(Continued)

(51) Int. Cl.
*G06F 3/01* (2006.01)
*G06T 7/246* (2017.01)
(Continued)

(52) U.S. Cl.
CPC ............ *G06T 19/006* (2013.01); *G06F 3/012* (2013.01); *G06T 7/246* (2017.01); *G06T 7/73* (2017.01);
(Continued)

(58) Field of Classification Search
CPC ......... G06T 19/006; G06T 7/246; G06T 7/73; G06T 2207/10028; G06T 2207/30201;
(Continued)

(56) References Cited

U.S. PATENT DOCUMENTS 11,036,987 B1 * 6/2021 Bramwell ............... G06T 19/20
2014/0282220 A1 9/2014 Wantland
(Continued)

FOREIGN PATENT DOCUMENTS

CN 105528799 A 4/2016
CN 105556508 A 5/2016
(Continued)

OTHER PUBLICATIONS

PCT International Search Report and Written Opinion issued Dec. 21, 2022 which pertains to PCT Application No. PCT/US2022/042684 filed Sep. 7, 2022. 15 pages.
(Continued)

*Primary Examiner* — Robert J Michaud
(74) *Attorney, Agent, or Firm* — Thompson Hine LLP

(57) ABSTRACT

Various implementations disclosed herein include devices, systems, and methods that present virtual content based on detecting a reflective object and determining a three-dimensional (3D) position of the reflective object in a physical environment. For example, an example process may include obtaining sensor data in a physical environment that includes one or more objects. The method may further include detecting a reflection of a first object of the one or more objects upon a reflective surface of a reflective object based on the sensor data. The method may further include determining a 3D position of the reflective object in the physical environment based on determining a 3D position of the reflection of the first object. The method may further include presenting virtual content in a view of the physical environment. The virtual content may be positioned at a 3D location based on the 3D position of the reflective object.

19 Claims, 8 Drawing Sheets

Related U.S. Application Data

(60) Provisional application No. 63/357,503, filed on Jun. 30, 2022.

(51) Int. Cl.
*G06T 7/73* (2017.01)
*G06T 19/00* (2011.01)
*G06V 20/50* (2022.01)
*H04S 7/00* (2006.01)

(52) U.S. Cl.
CPC ............ *G06V 20/50* (2022.01); *H04S 7/303* (2013.01); *G06T 2207/10028* (2013.01); *G06T 2207/30201* (2013.01); *H04S 2400/11* (2013.01)

(58) Field of Classification Search
CPC ......... G06V 20/50; G06F 3/012; H04S 7/303; H04S 2400/11
See application file for complete search history.

(56) References Cited

U.S. PATENT DOCUMENTS

| | | | |
|---|---|---|---|
| 2015/0248793 A1 | 9/2015 | Abovitz | |
| 2016/0196692 A1 | 7/2016 | Jan | |
| 2017/0098139 A1 | 4/2017 | Protter | |
| 2017/0206691 A1 | 7/2017 | Harrises | |
| 2017/0285345 A1* | 10/2017 | Ferens | G06F 3/0304 |
| 2017/0316617 A1 | 11/2017 | Jeong | |
| 2017/0337742 A1 | 11/2017 | Powderly | |
| 2018/0004478 A1 | 1/2018 | Chen | |
| 2018/0045963 A1 | 2/2018 | Hoover | |
| 2018/0082482 A1 | 3/2018 | Motta | |
| 2019/0122441 A1 | 4/2019 | Agrawal | |
| 2023/0384907 A1* | 11/2023 | Boesel | G06F 3/011 |
| 2024/0062346 A1 | 2/2024 | Meier | |
| 2024/0212272 A1 | 6/2024 | Temple | |

FOREIGN PATENT DOCUMENTS

| | | |
|---|---|---|
| CN | 106773054 A | 5/2017 |
| CN | 106937531 A | 7/2017 |
| CN | 107209561 A | 9/2017 |
| CN | 108780358 A | 11/2018 |
| CN | 108885482 A | 11/2018 |
| CN | 109496331 A | 3/2019 |
| CN | 109564706 A | 4/2019 |
| CN | 109791295 A | 5/2019 |
| CN | 109891365 A | 6/2019 |
| KR | 1020160046471 | 4/2016 |
| KR | 1020190039663 | 4/2019 |

OTHER PUBLICATIONS

Garcia-Garcia, A.; Orts-Escolano, S.; Oprea, S.O.; Villena-Martinez, V.; and Garcia-Rodriguez, J.; "A Review on Deep Learning Techniques Applied to Semantic Segmentation", arXiv: 1704.06857v1 [cs:CV] Apr. 22, 2017, pp. 1-23.

Cleland, Kathy; "Image Avatars: Self-Other Encounters In A Mediated World", University of Technology, Sydney, 2008, pp. 1-154.

Owen, David; Ping-Lin, Chang; "Detecting Reflections by Combining Semantic and Instance Segmentation"; arXiv:1904.13273v1 [cs:CV] Apr. 30, 2019; pp. 1-12.

Latoschik, Marc Erich; Lugrin, Jean-Luc; Roth, Daniel; "FakeMi: A Fake Mirror System for Avatar Embodiment Studies"; Conference: Proceeding of the 22nd ACM Symposium on Virtual Reality Software and Technolgy (VRST); Nov. 2016, pp. 1-11.

"How Virtual Mirror Technology Will Change the Way You Shop"; http://www.quytech.com/blog/categor/augmentedreality/; Jul. 6, 2018, pp. 1-14.

Sherstyuk, Andrei; Gavrilova,Marina; "Virtual Roommates in Multiple Shared Spaces"; Avatar Reality, Inc. and University of Calgary; Mar. 2011, pp. 1-8.

\* cited by examiner

CONTENT TRANSFORMATIONS BASED ON REFLECTIVE OBJECT RECOGNITION

CROSS-REFERENCE TO RELATED APPLICATION

This Application is a Continuation application of U.S. application Ser. No. 18/214,575 filed Jun. 27, 2023, which claims the benefit of U.S. Provisional Application Ser. No. 63/357,503 filed Jun. 30, 2022, each of which is incorporated herein by reference in its entirety.

TECHNICAL FIELD

The present disclosure generally relates to displaying content with electronic devices and, in particular, to systems and methods that present content in response to detecting a reflective object in a real-world physical environment.

BACKGROUND

Electronic devices are often used to present users with views that include virtual content and content from surrounding physical environments. It may be desirable to provide a means of efficiently detecting appropriate times and locations to provide these views.

SUMMARY

Various implementations disclosed herein include devices, systems, and methods that display virtual content based on detecting a mirror in a physical environment and determining a three-dimensional (3D) position of the mirror (e.g., where the plane of the mirror is located). A mirror may be detected amongst one or more objects in the physical environment based on sensor data (e.g., images, depth data, sonar, motion data, location data, etc.). Mirror detection may involve object recognition using machine learning techniques, sonar detection, image detection, and the like. Mirror detection may involve detecting that a user is wearing the device as a head mounted display (HMD) and standing in front of a mirror (e.g., based on the reflection, detecting the shape of the HMD, detecting light emitting diodes (LEDs) on the HMD, and the like). Mirror detection may involve detecting a light source (e.g., LEDs around the frame of the mirror, infrared (IR) LEDs behind the mirror) or some type of other marker on or proximately near the mirror (e.g., an augmented reality marker). Mirror detection techniques may include detecting and/or tracking facial regions over time. Mirror detection may involve comparing the location and relative angle of facial boundaries. Facial tracking may involve tracking the face/head of a user wearing an HMD and thus may involve tracking facial features and/or tracking HMD features (e.g., eye gaze detection, etc.). Determining a 3D position of the mirror may be based on comparing a reflected HMD position over time versus an HMD position from the associated motion data. Determining a 3D position of the mirror may be based on sampling the mid-point between the reflected position and real headset's position and plane detection. Determining a 3D position of the mirror may be based on checking if the reflected HMD rotation is a mirrored rotation of the real HMD by the calculated plane. This technique may involve determining mirror boundaries (e.g., bounding rectangles) based on techniques that detect differences between reflections and surfaces.

In some implementations, a context associated with a use of the electronic device in the physical environment may be determined, and virtual content may be displayed and/or modified based on the determined context. For example, detecting that the user is in a situation in which the user would benefit from virtual content assistance (e.g., a particular application). Example contexts that may trigger virtual content (e.g., a particular application) include (a) user activity at a time of day (e.g., a first look at a mirror in the morning, display calendar app and a news app), (b) a user performing an activity (e.g., putting on makeup triggers an enhancement or beauty app, or trying on new clothes triggers a clothing app), (c) a user acting in a certain way or a verbal command (e.g., dancing to record a social media video), and/or (d) a user being proximate to a particular location, object, or person (e.g., if the detected mirror is in a gym, display a gym app to track progress, etc.).

In some implementations, the virtual content may be provided in one or more different set of views to improve a user experience (e.g., while wearing a head mounted display (HMD)). Some implementations allow interactions with the virtual content (e.g., an application widget). In some implementations, a device (e.g., a handheld, laptop, desktop, or HMD) provides views of a 3D environment (e.g., a visual and/or auditory experience) to the user and obtains, with a sensor, physiological data (e.g., gaze characteristics) and motion data (e.g., controller moving the avatar, head movements, etc.) associated with a response of the user. Based on the obtained physiological data, the techniques described herein can determine a user's vestibular cues during the viewing of a 3D environment (e.g., an extended reality (XR) environment) by tracking the user's gaze characteristic(s) and other interactions (e.g., user movements in the physical environment). Based on the vestibular cues, the techniques can detect interactions with the virtual content and provide a different set of views to improve a user experience while viewing the 3D environment. The virtual content that appears positioned on (or based on) the mirror may be positioned on or based on a 3D position of the reflection (e.g., mirror). The virtual content may also be interactive such that a user can change the size of the app, move the app, select one or more selectable icons on the app, close the app, and the like.

In general, one innovative aspect of the subject matter described in this specification can be embodied in methods, at an electronic device having a processor and a sensor, that include the actions of obtaining sensor data from a sensor of an electronic device in a physical environment that includes one or more objects, detecting a reflective object amongst the one or more objects based on the sensor data, determining a three-dimensional (3D) position of the reflective object in the physical environment, and presenting virtual content in a view of the physical environment, wherein the virtual content is positioned at a 3D location based on the 3D position of the reflective object.

These and other embodiments can each optionally include one or more of the following features.

In some aspects, determining the 3D position of the reflective object in the physical environment comprises detecting a plane of the reflective object, and wherein the virtual content comprises one or more interactable elements that are presented on the detected plane of the reflective object.

In some aspects, determining the 3D position of the reflective object in the physical environment includes detecting a reflection of the electronic device upon the reflective object, determining a 3D position of the reflection of the electronic device, and determining, based on the 3D position of the reflective object, a mid-point location between the 3D position of the reflection of the electronic device and a 3D position of the electronic device.

In some aspects, in accordance with the electronic device rotating about a vertical axis during a first period of time, determining the 3D position of the reflective object in the physical environment includes detecting a reflection of a rotation of the electronic device upon the reflective object, determining 3D position data of the reflection of the rotation of the electronic device during the first period of time, and determining the 3D position of the reflective object based on comparing 3D position data of the electronic device and the 3D position data of the reflection of the rotation of the electronic device during the first period of time.

In some aspects, the 3D position of the reflective object is determined based on depth data from the sensor data and the 3D location of the virtual content is based on the depth data associated with the 3D position of the reflective object.

In some aspects, the 3D position of the reflective object comprises a 3D location of the reflective object that is at a first distance from the electronic device, the 3D location of the virtual content of the view of the physical environment is at a second distance from the electronic device that is greater than the first distance, and presenting the virtual content in the view of the physical environment comprises presenting spatialized audio at a perceived distance to a sound source based on the 3D location of the virtual content.

In some aspects, the sensor data includes images of a head of a user of the electronic device, and wherein detecting the reflective object is based on determining that the head of the user as seen in the images is rotating about a vertical axis by an amount that is double an amount of rotation of the electronic device, or the head of the user as seen in the images is not rotating about a forward axis.

In some aspects, the methods further include the actions of detecting a reflection in the reflective object amongst the one or more objects based on the sensor data, wherein detecting the reflection is based on tracking facial features of a user of the electronic device or facial recognition of the user.

In some aspects, the methods further include the actions of, in accordance with detecting the reflective object, determining a context associated with a use of the electronic device in the physical environment based on the sensor data, and presenting the virtual content based on the context.

In some aspects, the context includes a time of day, and presenting the virtual content is based on the time of day, the context includes movements of a user of the electronic device with respect to a reflection in the reflective object, and presenting the virtual content is based on the movements of the user, or the context includes a user interaction with the reflection, and presenting the virtual content is based on the user interaction with the reflection.

In some aspects, determining the context comprises determining use of the electronic device in a new location, determining use of the electronic device during a type of activity, or determining that the electronic device is within a proximity threshold distance of a location, an object, another electronic device, or a person.

In some aspects, the methods further include the actions of determining a scene understanding of the physical environment based on the sensor data, determining, based on the scene understanding, that a user of the electronic device is the only user within an area associated with the view of the physical environment, and presenting the virtual content based on a user preference setting associated with the user being the only user within the area associated with the view of the physical environment.

In some aspects, the virtual content comprises a visual representation of another user based on a communication session with another electronic device.

In some aspects, a depth position of the 3D location of the virtual content is the same as a depth of a reflected object detected in the reflection.

In some aspects, the electronic device is a head-mounted device (HMD).

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
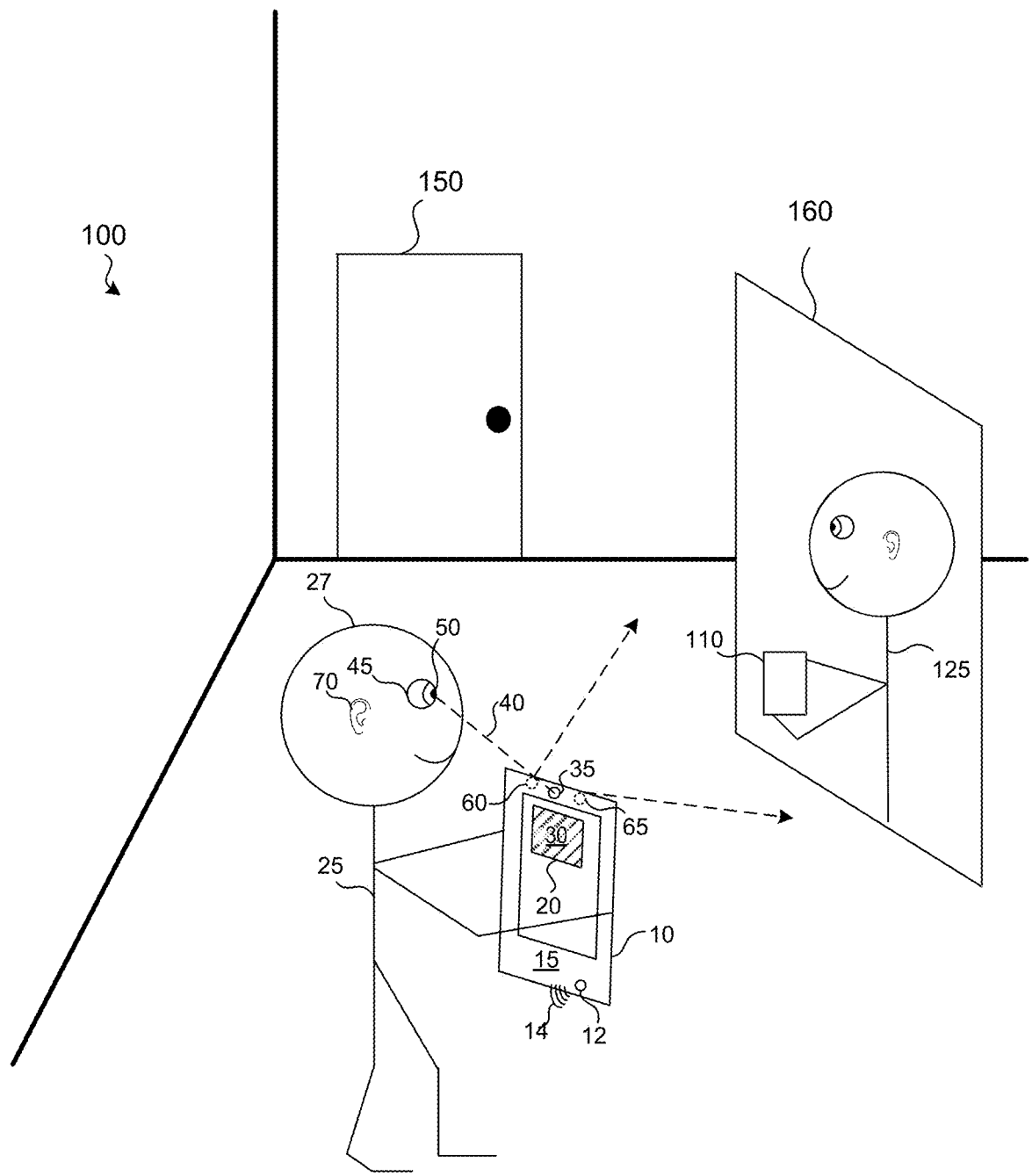
FIG. 1 illustrates a device presenting a visual environment and obtaining physiological data from a user in a real-world physical environment that includes a mirror according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates a real-world physical environment 100 including a device 10 with a display 15. In some implementations, the device 10 presents content 20 to a user 25, and a visual characteristic 30 that is associated with content 20. In some examples, content 20 may be a button, a user interface icon, a text box, a graphic, etc. In some implementations, the visual characteristic 30 associated with content 20 includes visual characteristics, such as hue, saturation, size, shape, spatial frequency, motion, highlighting, etc. For example, content 20 may be displayed with a visual characteristic 30 of green highlighting covering or surrounding content 20.

Additionally, the physical environment 100 includes a door 150 and a mirror 160. The mirror 160 reflects a portion of the physical environment 100. For example, as illustrated, mirror 160 is showing a reflection 125 of user 25 and reflection 110 of device 10 as the user 25 is gazing at his or her own reflection 125. The remaining environment of physical environment 100 that is behind the user 25 (e.g., the background) is not illustrated in FIG. 1, or the other figures, for illustrative purposes so that it is easier to focus on the subject matter discussed herein (e.g., a reflected portion of the user 25 and device 10).

In some implementations, content 20 may represent a visual three-dimensional (3D) environment (e.g., an extended reality (XR) environment), and the visual characteristic 30 of the 3D environment may continuously change. Head pose measurements may be obtained by an inertial measurement unit (IMU) or other tracking systems. In one example, a user can perceive a real-world physical environment while holding, wearing, or being proximate to an electronic device that includes one or more sensors that obtains physiological data to assess an eye characteristic that is indicative of the user's gaze characteristics, and motion data of a user.

In some implementations, the visual characteristic 30 is a feedback mechanism for the user that is specific to the views of the 3D environment (e.g., a visual or audio cue presented during the viewing). In some implementations, the view of the 3D environment (e.g., content 20) can occupy the entire display area of display 15. For example, content 20 may include a sequence of images as the visual characteristic 30 and/or audio cues presented to the user (e.g., 360-degree video on a head-mounted device (HMD)).

The device 10 obtains physiological data (e.g., pupillary data) from the user 25 via a sensor 35 (e.g., one or more camera's facing the user to capture light intensity data and/or depth data of a user's facial features and/or eye gaze). For example, the device 10 obtains eye gaze characteristic data 40. While this example and other examples discussed herein illustrate a single device 10 in a real-world physical environment 100, the techniques disclosed herein are applicable to multiple devices as well as to other real-world physical environments. For example, the functions of device 10 may be performed by multiple devices.

In some implementations, as illustrated in FIG. 1, the device 10 is a handheld electronic device (e.g., a smartphone or a tablet). In some implementations, the device 10 is a wearable HMD. In some implementations the device 10 is a laptop computer or a desktop computer. In some implementations, the device 10 has a touchpad and, in some implementations, the device 10 has a touch-sensitive display (also known as a "touch screen" or "touch screen display").

In some implementations, the device 10 includes sensors 60, 65 for acquiring image data of the physical environment. The image data can include light intensity image data and/or depth data. For example, sensor 60 may be one or more video cameras for capturing RGB data, and sensor 65 may be one or more depth sensors (e.g., a structured light, a time-of-flight, or the like) for capturing depth data.

In some implementations, the device 10 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as pupil dilation or pupil diameter. Moreover, the point of gaze estimated from the eye tracking images may enable gaze-based interaction with content shown on the display of the device 10. In some implementations, one or more IR LEDs may be outward facing (e.g., facing the physical environment, such as towards the mirror 160) which may be used in the reflection of the mirror 160 to detect the location of the mirror 160 by the device 110 via sensors 60, 65, as further discussed herein.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 10 employs various physiological sensor, detection, or measurement systems. In an exemplary implementation, detected physiological data includes head pose measurements determined by an IMU or other tracking system. In some implementations, detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 10 may concurrently detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, a machine learning model (e.g., a trained neural network) is applied to identify patterns in physiological data, including identification of physiological responses to viewing the 3D environment (e.g., content 20 of FIG. 1). Moreover, the machine learning model may be used to match the patterns with learned patterns corresponding to indications of interest or intent of the user 25 interactions. In some implementations, the techniques described herein may learn patterns specific to the particular user 25. For example, the techniques may learn from determining that a peak pattern represents an indication of interest or intent of the user 25 in response to a particular visual characteristic 30 when viewing the 3D environment, and use this information to subsequently identify a similar peak pattern as another indication of interest or intent of the user 25. Such learning can take into account the user's relative interactions with multiple visual characteristics 30, in order to further adjust the visual characteristic 30 and enhance the user's physiological response to the 3D environment.

In some implementations, the location and features of the head 27 of the user 25 (e.g., an edge of the eye, a nose or a nostril) are extracted by the device 10 and used in finding coarse location coordinates of the eyes 45 of the user 25, thus simplifying the determination of precise eye 45 features (e.g., position, gaze direction, etc.) and making the gaze characteristic(s) measurement more reliable and robust. Furthermore, the device 10 may readily combine the 3D location of parts of the head 27 with gaze angle information obtained via eye part image analysis in order to identify a given on-screen object at which the user 25 is looking at any given time. In some implementations, the use of 3D mapping in conjunction with gaze tracking allows the user 25 to move his or her head 27 and eyes 45 freely while reducing or eliminating the need to actively track the head 27 using sensors or emitters on the head 27.

By tracking the eyes 45, some implementations reduce the need to re-calibrate the user 25 after the user 25 moves his or her head 27. In some implementations, the device 10 uses depth information to track the pupil's 50 movement, thereby enabling a reliable present pupil diameter to be calculated based on a single calibration of user 25. Utilizing techniques such as pupil-center-corneal reflection (PCCR), pupil tracking, and pupil shape, the device 10 may calculate the pupil diameter, as well as a gaze angle of the eye 45 from a fixed point of the head 27, and use the location information of the head 27 in order to re-calculate the gaze angle and other gaze characteristic(s) measurements. In addition to reduced recalibrations, further benefits of tracking the head 27 may include reducing the number of light projecting sources and reducing the number of cameras used to track the eye 45.

In some implementations, a pupillary response may be in response to an auditory stimulus that one or both ears 70 of the user 25 detect. For example, device 10 may include a speaker 12 that projects sound via sound waves 14. The device 10 may include other audio sources such as a headphone jack for headphones, a wireless connection to an external speaker, and the like.

Figure 2C:
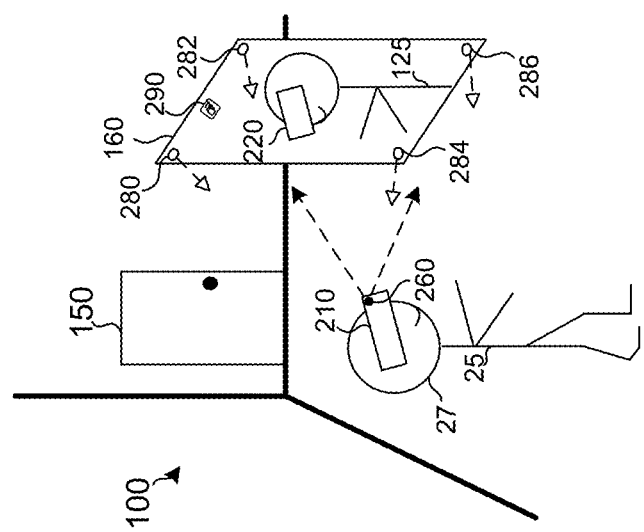
FIGS. 2A, 2B, and 2C illustrate a user wearing a head-mounted device (HMD), and the HMD is detecting a mirror according to some implementations.
Figure 2B:
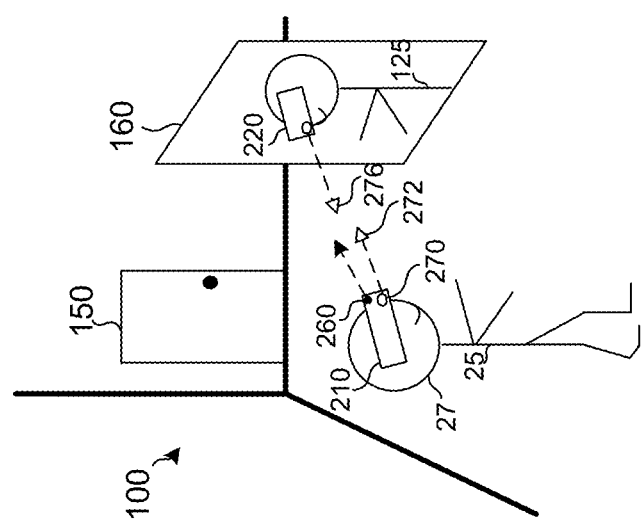
Figure 2A:
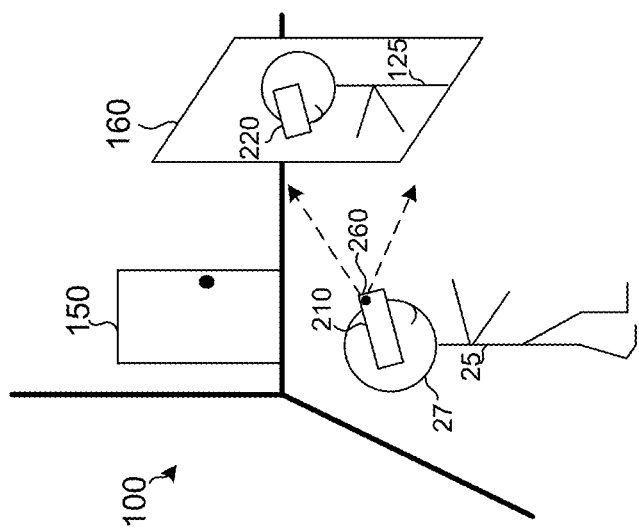

FIGS. 2A-2C illustrate a user wearing an HMD as the device is detecting a mirror in a physical environment according to some implementations. FIGS. 2A-2C illustrate the physical environment 100 of FIG. 1, except that the device 10 is replaced with the device 210, an HMD. The physical environment 100 includes a door 150 and a mirror 160 that reflects a portion of the physical environment 100. For example, as illustrated in FIGS. 2A-2C, mirror 160 is showing a reflection 125 of user 25 and reflection 220 of device 210 as the user 25 is gazing at his or her own reflection 125 while wearing the device 210 on his or her head 27. For example, the device 210 (HMD) may be configured as a pass-through video device via a video camera. or the device 210 may include a transparent element that allows the user 25 to view the physical environment.

FIG. 2A illustrates a user 25 wearing a device 210, and the device 210 is detecting the mirror 160 in a physical environment 100 according to some implementations. In particular, device 210 detects the mirror 160 by acquiring image data via sensor 260 and determining that the reflection 220 of the device 210 depicts an HMD (e.g., based on shape) using one or more known techniques (e.g., object detection algorithms or the like).

FIG. 2B illustrates a user 25 wearing a device 210, and the device 210 is detecting the mirror 160 in a physical environment 100 according to some implementations. In particular, device 210 detects the mirror 160 by emitting IR LED light 272 from the IR LED emitter 270 and acquiring data via sensor 260 (e.g., an IR LED light detector) and determines that the acquired data indicates detection of IR LED reflection 276 using one or more known techniques for detecting IR LED reflections.

FIG. 2C illustrates a user 25 wearing a device 210, and the device 210 is detecting the mirror 160 in a physical environment 100 according to some implementations. In particular, device 210 detects the mirror 160 by acquiring data via sensor 260 (e.g., an IR LED light detector) of the light (e.g., IR LED light) from the light sources 280, 282, 284, and/or 286 (e.g., IR LED emitters) using one or more known techniques for detecting light. Based on the detected light from one or more of the light sources 280, 282, 284, and 286, the device 210 can determine a plane and/or the boundaries of the mirror 160. The light sources 280, 282, 284, and 286 are illustrated in the corners for illustrative purposes. The location of each light source (e.g., IR LED light, or the like) may be placed at any location on the mirror 160, or may be placed on the edge or frame of the mirror 160.

Additionally, or alternatively, in some implementations a marker 290 may be utilized to detect the mirror 160. For example, in a physical environment, a physical element (e.g., a QR code, barcode, sticker, etc.) may be placed on the mirror 160 such that the device 210 via image data from sensor 260 can detect marker 290 and determine from the data acquired from the marker 290 that the object (mirror 160) is a mirror. Alternatively, in a virtual environment, such as an extended reality environment, the marker 290 may only be viewed as virtual or augmented sticker that can be viewed by the device 210. For example, a user or the system, can "mark" or designate the mirror 160 as a mirror, and virtually place marker 290 at those particular coordinates such that during an additional use, once the device 210 detects the marker 290, the system can quickly and automatically determine that the object is the mirror 160 without having to do other computations or determinations (e.g., based on reflection data or IR LED light data, etc.). In some implementations, the data acquired from the marker 290 may also be used by the devices 10, 210, and the like, to pull data for any type of object that they are placed upon (e.g., a barcode for a product, such as mirror 160). The data acquired from marker 290 may include the information such as boundaries, that can be used with the techniques described herein for the size of the display for the virtual content to be displayed upon, if applicable.

Referring back to FIGS. 2A-2C regarding different methods for detecting a mirror, the device 210 or device 10, using techniques described herein, can determine a 3D position of the mirror 160 in the physical environment 100. For example, according to techniques, a system can determine a location of the plane of the mirror 160. Additionally, or alternatively, techniques can define or determine the boundaries of the plane of the mirror within the 3D coordinate system of the physical environment. For example, determining the boundaries may include determining a defined length and width of the physical mirror 160. For mirror surfaces that are too large for a particular view, the system may define the boundary edges to be smaller (e.g., a smaller area to display the virtual content). The 3D mirror position may be determined based on comparing the reflected headset position over time versus headset position from motion data. Additionally, 3D mirror position may be determined based on sampling the mid-point between the reflected position and real headset's position and plane detection. Moreover, 3D mirror position may be determined based on checking if the reflected headset rotation is a mirrored rotation of the real headset by the calculated plane. This may further involve determining mirror boundaries (e.g., the bounding rectangles) based on techniques that detect differences between reflections and surfaces.

Figure 3:
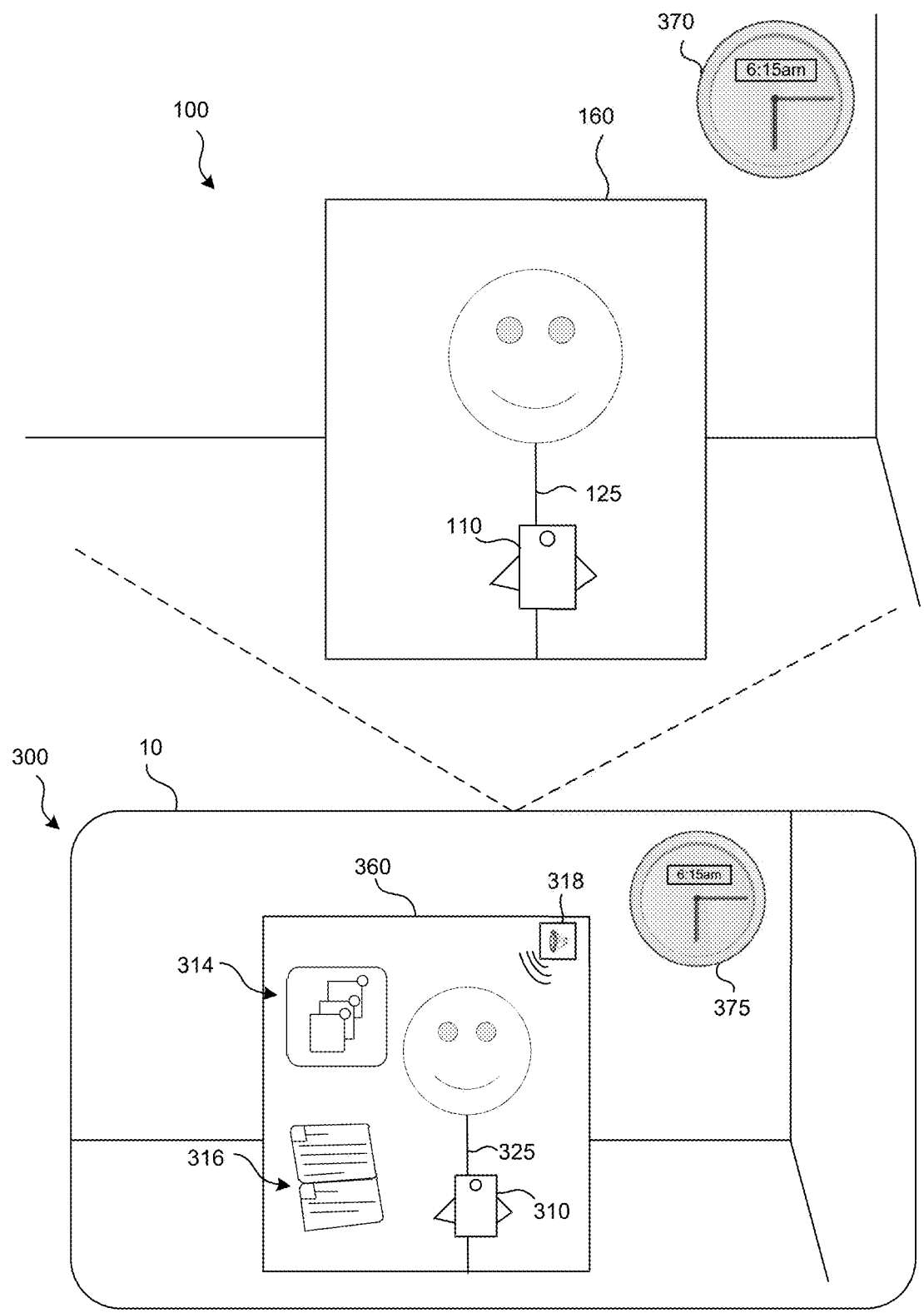
FIG. 3 illustrates an exemplary view of the electronic device of FIG. 1 in accordance with some implementations.

FIG. 3 illustrates an exemplary view 300 of the physical environment 100 provided by electronic device 10 of FIG. 1. The view 300 may be a live camera view of the physical environment 100, a view of the physical environment 100 through a see-through display, or a view generated based on a 3D model corresponding to the physical environment 100. The view 300 includes depictions of aspects of a physical environment 100 such as a representation 360 of mirror 160 and representation 375 of clock 370 (not shown in FIG. 1 based on the viewing angle of the user 25 in FIG. 1). Within the view 300 of representation 360 of mirror 160 is the representation 325 of the reflection 125 of user 25 and representation 310 of the reflection 110 of the device 10.

Additionally, the view of representation 360 (e.g., mirror 160) includes virtual content 314, virtual content 316, and audio content 318 that may be presented (e.g., displayed and/or sound is emitted from) based on detecting a reflection or detecting a mirror 160 (e.g., detecting a reflection from a surface of an object) amongst the one or more objects in the physical environment 100 based on the obtained sensor data. The virtual content 314 and virtual content 316 may be selected for presentation based on the context and positioned at a 3D location based on a 3D position of the mirror 160 (e.g., a reflective surface of an object). For example, the determined context of the current environment of FIG. 3 may be that the user 25 is looking at himself or herself in the mirror 160 early in the morning (e.g., clock 370 shows a time of 6:15 am). Thus, the context includes a time of day, and presenting the virtual content 314, 316 (e.g., virtual applications) is based on the time of day. In other words, detecting that the user 25 is in a situation in which the user would benefit from a particular user interface, such as in the morning, device 10 may provide a calendar application (virtual content 316), a news application (virtual content 314), and the like. Additionally, the virtual content 314, 316 may be presented such that it appears to be located on the surface of the representation 360 of mirror 160 in view 300. In other examples, the virtual content 314, 316 may be presented at a depth corresponding to the depth of the reflection 125 of user 25 (e.g., twice the distance between user 25 and mirror 160). Positioning virtual content 314, 316 at this depth may advantageously prevent user 25 from having to change the focal plane of their eyes when looking from their reflection 125 to virtual content 314, 316, or vice versa. In yet other examples, the virtual content 314, 316 may be presented such that it appears to be located at other locations in view 300.

In some implementations, virtual content 314, 316 and/or audio content 318 may be provided automatically (e.g., in response to the determined context based on time of day). Additionally, or alternatively, virtual content 314, 316 and/or audio content 318 may be provided by the user's interaction with the device 10 (e.g., selecting an app) or by a verbal request (e.g., "please show my calendar app on the mirror"). The virtual content 314, 316 is for an exemplary illustration. Additionally, or alternatively, the virtual content 314, 316 may include spatialized audio and/or video. For example, virtual content 314, instead of showing a news feed application, may include a live news channel displayed on the representation 360 of the mirror 160 (e.g., a news television channel being displayed virtually within the representation 360 of mirror 160). In an exemplary implementation, the virtual content includes an audio cue played to be heard from a 3D position on the representation 360 of the mirror 160 using spatial audio, wherein the 3D position is determined based on the context, the position of the reflection (e.g., mirror 160), or both. For example, for a particular use case where an application desires to direct the user's attention to a particular location (and a particular depth), a spatialized audio cue can be presented to the user 25 in order to cause him or her to look at a reflection of an object that may be off in the distance (but within the view of the mirror 160).

Audio content 318 is represented by an icon in FIG. 3, but audio content 318 may or may not be visible to the user and is illustrated in FIG. 3 to represent a location for the spatialized audio that will be heard by the user as being "behind" the mirror. For example, based on the detected plane of the mirror 160, a perceived distance to a sound source may be implemented. In some implementations, the spatialized audio may be viewed within a virtual reflection. For example, a virtual application, such as a virtual avatar, may appear to be speaking from the 3D location of the reflection, not from the 3D location of the mirror (e.g., a reflection and the associated sound may appear to be at a distance that is twice as far as the distance to the actual surface of the mirror). Alternatively, the icon for audio content 318 may be shown to the user as well if the sound associated with the icon 318 does not have a particular source (e.g., not coming from a particular application or from an avatar of another user, etc.).

The electronic device 10 determines whether an object in the physical environment 100 is a reflective object, such as mirror 160, by using one or more mirror detection techniques that are further discussed herein. For example, detecting a mirror or other reflective surface amongst one or more objects in a physical environment. For example, a user wakes up in the morning to look at the mirror with his or her device (e.g., device 10), the system can detect a mirror based on one more mirror detection techniques. Mirror detection techniques may include detecting that a user is wearing the device as an HMD and standing in front of a mirror (e.g., based on the reflection, detecting the shape of the HMD, detecting LEDs on the HMD, and the like). Mirror detection may involve detecting a light source (e.g., LEDs around the frame of the mirror, IR LEDs behind the mirror) or some type of other marker on or proximately near the mirror (e.g., an augmented reality marker). Mirror detection techniques may include using facial detection regions over time, a mirror can be detected by comparing the location and relative angle of the facial boundaries when wearing an HMD. A mirror can be detected based on object recognition using ML techniques. In some examples, detecting the mirror may include using facial detection regions over time, where a reflection can be detected by comparing the location and relative angle of the facial boundaries when wearing an HMD. Once it has been detected that a user is looking at a mirror, then techniques described herein may determine whether the reflection is a mirror and detect the boundaries of the mirror based on shape analysis, edge detection, and/or the loss of the tracked facial recognition in the region.

Figure 4:
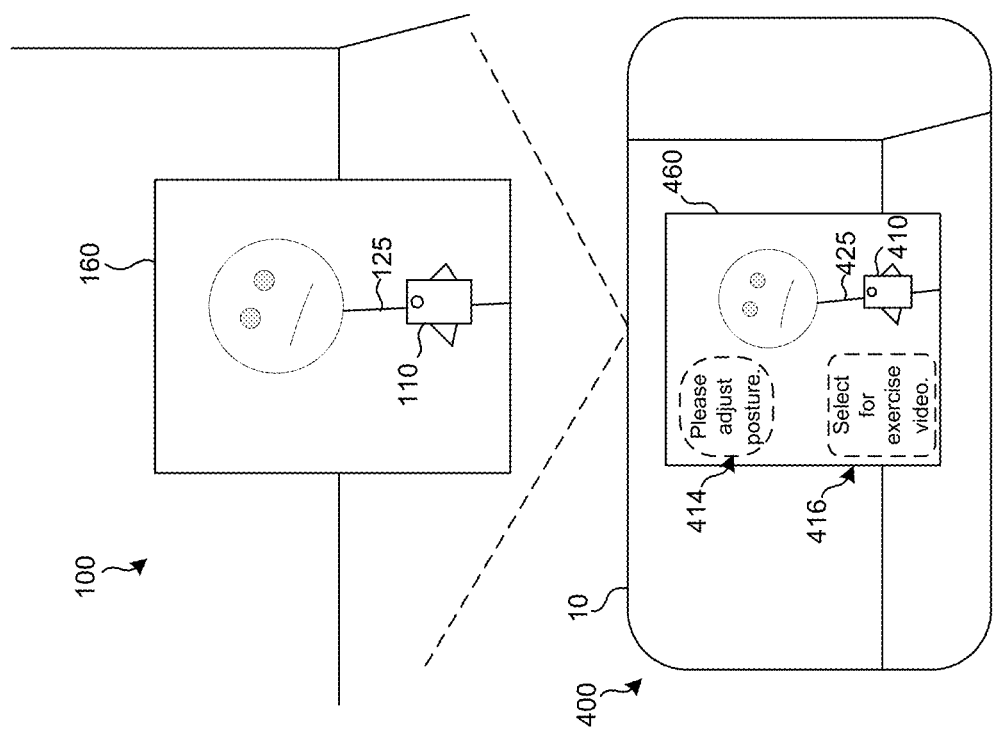
FIG. 4 illustrates an exemplary view of the electronic device of FIG. 1 in accordance with some implementations.

FIG. 4 illustrates an exemplary view 400 of the physical environment 100 provided by electronic device 10. The view 400 may be a live camera view of the physical environment 100, a view of the physical environment 100 through a see-through display, or a view generated based on a 3D model corresponding to the physical environment 100. The view 400 includes depictions of aspects of a physical environment 100 such as a representation 460 of mirror 160. Within the view 400 of representation 460 of mirror 160 is the representation 425 of the reflection 125 of user 25 and representation 410 of the reflection 110 of the device 10.

Additionally, the view of representation 460 (e.g., mirror 160) includes virtual content 414 and virtual content 416 that may be presented (e.g., displayed and/or spatialized sound is emitted from) based on detecting a reflection or detecting a mirror 160 (e.g., detecting a reflection from a surface of an object) amongst the one or more objects in the physical environment 100 based on the obtained sensor data. The virtual content 414 and virtual content 416 may be selected for presentation based on the context and position at a 3D location based on a 3D position of the mirror 160 (e.g., a reflective surface of an object). For example, the determined context of the current environment of FIG. 4 may be that the user 25 is looking at himself or herself in the mirror 160 and is either unhappy and/or displaying incorrect posture while standing (e.g., slouching). Thus, the context includes physiological data about the user 25, and presenting the virtual content 414, 416 (e.g., virtual applications) is based on the physiological tracking. In some implementations, physiological based tracking, such as skeleton tracking, may be used for instruction, evaluation, and feedback relating to posture, exercise, motion, clothing, etc. In an exemplary implementation, the sensor data obtained by device 10 includes physiological data of a user of the electronic device, and techniques described herein include detecting movements of the user based on the physiological data, and modifying the virtual content in the view of the physical environment based on the detected movements of the user. In other words, detecting that the user 25 is in a situation in which the user would benefit from a particular user interface, device 10 may provide a posture analyzer application (virtual content 414), and/or provide an exercise application (virtual content 416), and the like. Additionally, the virtual content 414, 416 may be presented such that it appears to be located on the surface of the representation 460 of mirror 160 in view 400. In other examples, the virtual content 414, 416 may be presented at a depth corresponding to the depth of the reflection 125 of the user 25 (e.g., twice the distance between user 25 and mirror 160). Positioning virtual content 414, 416 at this depth may advantageously prevent user 25 from having to change the focal plane of their eyes when looking from their reflection 125 to virtual content 414, 416, or vice versa. In yet other examples, the virtual content 414, 416 may be presented such that it appears to be located at other locations in view 400.

Figure 5:
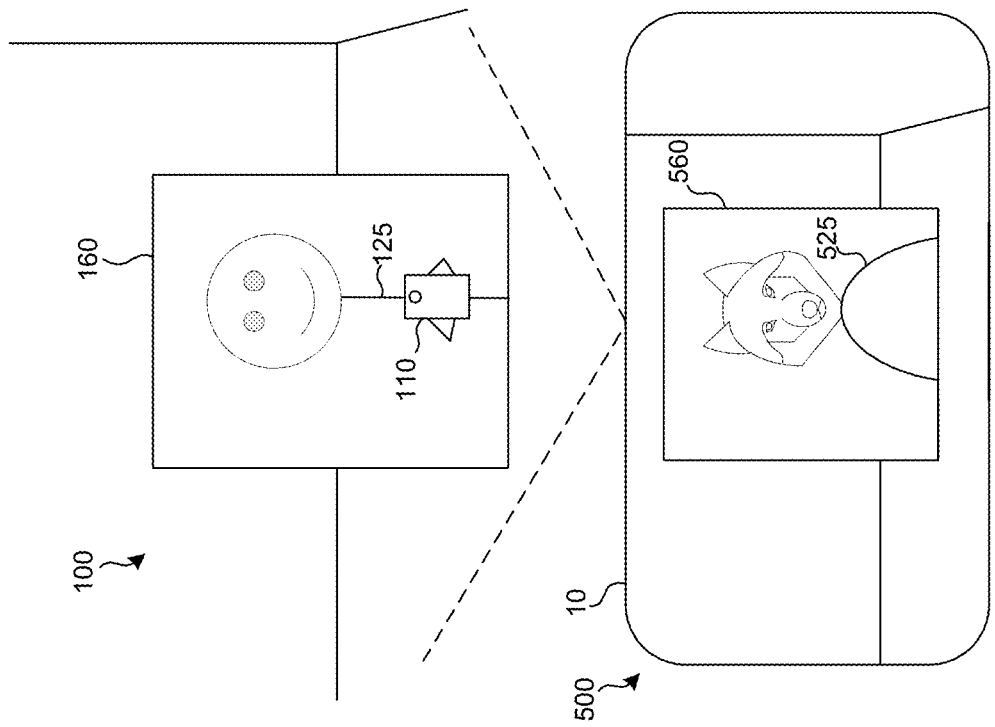
FIG. 5 illustrates an exemplary view of the electronic device of FIG. 1 in accordance with some implementations.

FIG. 5 illustrates an exemplary view 500 of the physical environment 100 provided by electronic device 10. The view 500 may be a live camera view of the physical environment 100, a view of the physical environment 100 through a see-through display, or a view generated based on a 3D model corresponding to the physical environment 100. The view 500 includes depictions of aspects of a physical environment 100 such as a representation 560 of mirror 160 and a user representation 525 of the reflection 125 of the user 25. For example, as illustrated in FIG. 5, the user representation 525 is presented as the virtual content over body and face of the reflection 125 of the user 25 (e.g., a memoji or animoji, such as a wolf face and an associated body). Other techniques may be used to present virtual content only over the face of a user (e.g., only presenting a wolf face avatar, but still showing the hands, body, etc. of the user in the reflection of the mirror).

In some implementations, the virtual content of FIGS. 3-5 (e.g., virtual content 314, 316, 414, 416, 525, and audio content 318) can be modified over time based on proximity of the electronic device to an anchored location (e.g., mirror 160). For example, as the user 25 gets closer, the spatialized audio notifications (e.g., audio content 318) may indicate the closer proximity. Additionally, or alternatively, for a visual icon, the virtual content may increase in size or start flashing if the user starts to walk in a different direction away from the mirror 160. Additionally, the virtual content may include a text widget application that tells the user a location of an object displayed within the reflections of the mirror (or any reflective surface of an object).

In some implementations, a visual transition effect (e.g., fading, blurring, etc.) may be applied to the virtual content to provide the user with a more enjoyable XR experience. For example, as a user turns away from virtual content by more than a threshold amount (e.g., outside of an activation zone), the visual transition effect may be applied to the virtual content. Defining the activation zone based on an anchored content object encourages a user to stay relatively stationary and provides a target object to focus on. As a user moves, the visual transition effect applied to the virtual content may indicate to the user that the virtual content is going to deactivate (e.g., fades away). Thus, the user can dismiss the virtual content by turning away from the virtual content. In some implementations, transitioning away or fading away the virtual content may be based on a rate of turning their head or electronic device 10 exceeding a threshold or an amount of turning their head or electronic device 10 exceeding a threshold, such that the virtual content will remain in the 3D location where it was just before the user turned their head or electronic device 10.

The views 300, 400, 500, etc. display virtual content as being in a first, world-locked presentation mode such that it appears to remain at its position within environment 100 despite translational and/or rotational movement of the electronic device 10 (e.g., window applications anchored to a particular location of the reflection 325 of the user 25 in view 300). The view of the virtual content may remain world-locked until the user satisfies some condition and may transition to a different presentation mode, such as a head/display-locked presentation mode in which the virtual content remains displayed at the same location on the display 15 or relative to electronic device 10 as translational and/or rotational movement is applied to electronic device 10. For example, the window application anchored to the mirror 160 may be transitioned to a widget anchored to the top left corner of display 15 that the user can later activate to see the application window. Selectively anchoring virtual content to a position on the display rather than a location in the environment when not in use may save power by requiring localization of content only when necessary. In certain implementations, better legibility of content (e.g., text messages within the virtual content) may also be achieved by positioning the virtual content at a fixed distance from the electronic device 10 or user's viewpoint. For example, holding a book at a particular distance can make it easier to read and understand. Similarly, positioning virtual content at a desirable distance can also make it easier to read and understand.

In some implementations, the system can detect the user's interaction with virtual content (e.g., reaching out to "touch" the virtual content) and may generate and display an application window. For example, a user in FIG. 4, may provide a motion of reaching out to interact with the interactable element 416, and the system may then display a new application window (e.g., an exercise video). In some implementations, the system can detect that the user has temporarily moved his or her viewing direction to another location outside of an activation zone (e.g., an activation zone that contains a view of the virtual content application window). For example, the user may look away from an initial activation zone in response to being briefly distracted by some event in the physical environment (e.g., another person in the room). The system, based on the user "looking away" from the initial activation zone, may start to fade away and/or shrink the virtual content. However, once the user has returned to a viewpoint that is similar or identical to the original view when the virtual content and an associated application window was initially active (e.g., within an activation zone), the system can return to displaying the virtual content and an associated application window as initially intended when the user activated the application by interacting with the virtual content, before the user was briefly distracted.

In some implementations, the system can locate the mirror 160 based on a notification or a request from an application on the device 110 or from another device. For example, if the user 25 receives a 3D model of a clothing article to view from another user (e.g., a friend provides a 3D model of a hat for the user 25 to virtually try on), the system can automatically attempt to locate a mirror (or a reflection on a surface of an object). Additionally, or alternatively, if the user 110 is in communication with another user via another device (e.g., a communication session such as a video chat room as discussed herein with reference to FIG. 6), and the other user sends a notification to find a mirror and try on a 3D model of a hat, the system can also automatically attempt to locate a mirror if the user 25 accepts the notification/request to try on the 3D model of the hat.

Figure 6:
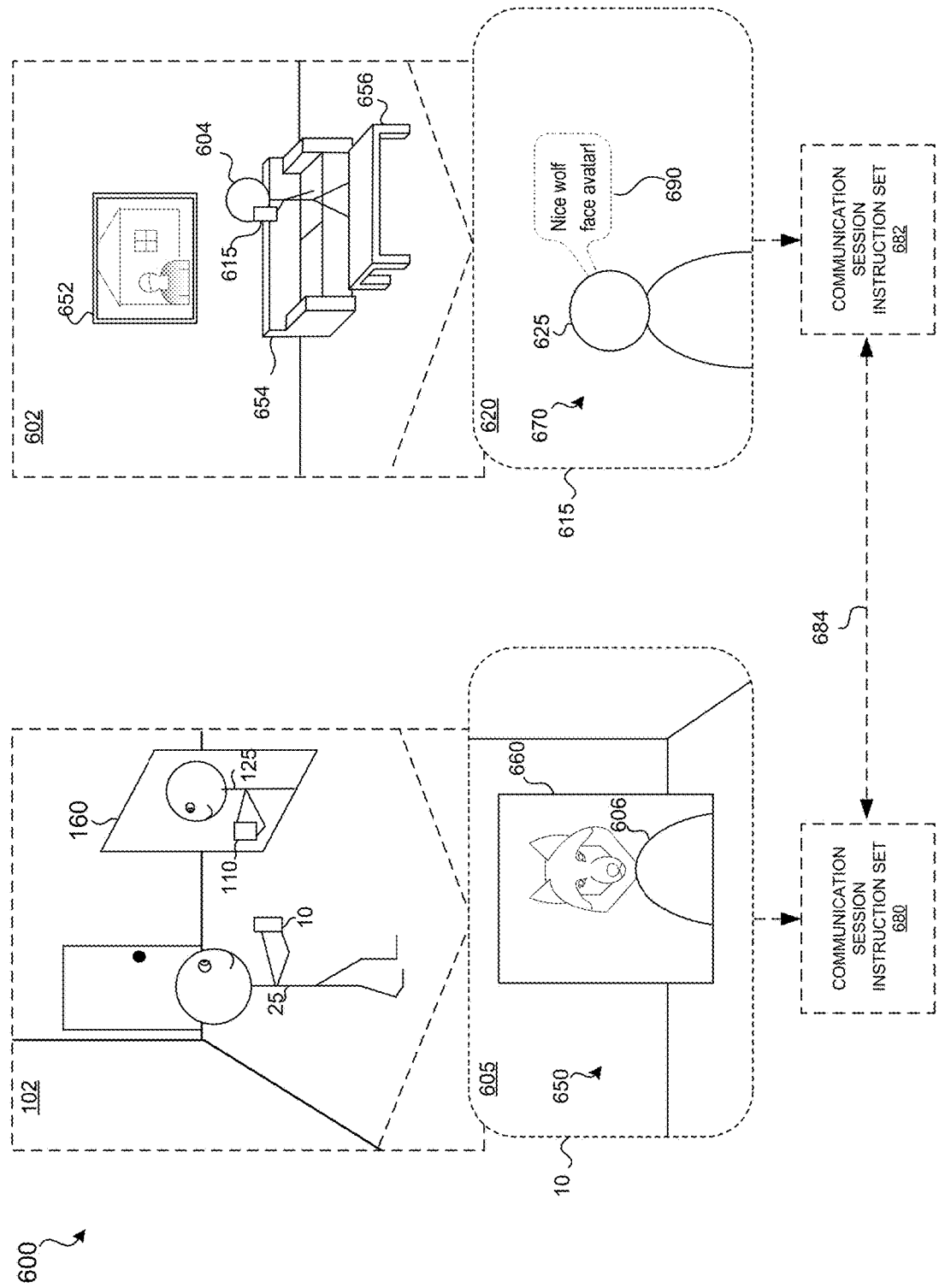
FIG. 6 illustrates exemplary electronic devices operating in different physical environments during a communication session with a view for a first device of a user representation of a second user on a mirror in accordance with some implementations.

FIG. 6 illustrates exemplary electronic devices operating in different physical environments during a communication session with a view for a first device of a user representation of a second user on a mirror in accordance with some implementations. In particular, FIG. 6 illustrates exemplary operating environment 600 of electronic devices 10, 615 operating in different physical environments 102, 602, respectively, during a communication session, e.g., while the electronic devices 10, 615 are sharing information with one another or an intermediary device, such as a communication session server. In this example of FIG. 6, the physical environment 102 (e.g., physical environment 100 of FIG. 1) is a room that includes a mirror 160. The electronic device 10 includes one or more cameras, microphones, depth sensors, or other sensors that can be used to capture information about and evaluate the physical environment 102 and the objects within it, as well as information about the user 25 of the electronic device 10. The information about the physical environment 102 and/or user 25 may be used to provide visual content (e.g., for user representations) and audio content (e.g., for text transcription) during the communication session. For example, a communication session may provide views to one or more participants (e.g., users 25, 604) of a 3D environment that is generated based on camera images and/or depth camera images of the physical environment 102, a representation of user 25 based on camera images and/or depth camera images of the user 25, and/or text transcription of audio spoken by a user (e.g., a transcription bubble). As illustrated in FIG. 6, user 25 is speaking with user 604.

In this example, the physical environment 602 is a room that includes a wall hanging 652, a sofa 654, and a coffee table 656. The electronic device 615 includes one or more cameras, microphones, depth sensors, or other sensors that can be used to capture information about and evaluate the physical environment 602 and the objects within it, as well as information about the user 604 of the electronic device 615. The information about the physical environment 602 and/or user 604 may be used to provide visual and audio content during the communication session. For example, a communication session may provide views of a 3D environment that is generated based on camera images and/or depth camera images (from electronic device 10) of the physical environment 102 as well as a representation 625 of user 25 based on camera images and/or depth camera images (from electronic device 10) of the user 25. For example, a 3D environment may be sent by the device 10 by a communication session instruction set 680 in communication with the device 615 by a communication session instruction set 682 (e.g., via network connection 684). As illustrated in FIG. 6, the audio spoken by user 25 is transcribed (e.g., via communication instruction set 682) at device 615 (or via remote server), and the view 620 provides user 604 with a text transcription of audio spoken by the speaker (user 25) via the transcription bubble 690 (e.g., "Nice wolf face avatar!"). FIG. 6 illustrates an example of a virtual environment (e.g., 3D environment 650) where user preferred user representations (avatars) are provided to users for each user (e.g., a wolf avatar for user representation 606 of user 604 displayed on the representation 660 of the mirror 160), provided there is consent to view the user representations of each user during a particular communication session. For example, as illustrated in FIG. 6, the electronic device 615 within physical environment 602 provides a view 620 that enables user 604 to view a representation 625 (e.g., an avatar) of at least a portion of the user 25 (e.g., from mid-torso up) within the same 3D environment 670 with a transcription of the words spoken by the user 25 via the transcription bubble 690 (e.g., "Nice wolf face avatar!").

In the example of FIGS. 1 and 3-6, the electronic devices 10 and 615 are illustrated as hand-held devices, and in FIGS. 2A-2C, the electronic device 210 is illustrated as a head-mounted device (HMD). The electronic devices 10, 210, and 615 may be a mobile phone, a tablet, a laptop, so forth. In some implementations, electronic devices 10, 210, and 615 may be worn by a user. For example, electronic devices 10, 210, and 615 may be a watch, a HMD, head-worn device (glasses), headphones, an ear mounted device, and so forth. In some implementations, functions of the devices 10, 210, and 615 are accomplished via two or more devices, for example a mobile device and base station or a head mounted device and an ear mounted device. Various capabilities may be distributed amongst multiple devices, including, but not limited to power capabilities, CPU capabilities, GPU capabilities, storage capabilities, memory capabilities, visual content display capabilities, audio content production capabilities, and the like. The multiple devices that may be used to accomplish the functions of electronic devices 10, 210, and 615 may communicate with one another via wired or wireless communications. In some implementations, each device communicates with a separate controller or server to manage and coordinate an experience for the user (e.g., a communication session server). Such a controller or server may be located in or may be remotely relative to the physical environment 100.

Additionally, in the example of FIGS. 3-6, the 3D environments 300, 400, 500, 650, and 670 are XR environments that are based on a common coordinate system that can be shared with other users (e.g., a virtual room for avatars for a multi-person communication session). In other words, the common coordinate system of the 3D environments 300, 400, 500, 650, and 670 are different than the coordinate system of the physical environments 100, 602, etc. For example, a common reference point may be used to align the coordinate systems. In some implementations, the common reference point may be a virtual object within the 3D environment that each user can visualize within their respective views. For example, a common center piece table that the user representations (e.g., the user's avatars) are positioned around within the 3D environment. Alternatively, the common reference point is not visible within each view. For example, a common coordinate system of a 3D environment may use a common reference point for positioning each respective user representation (e.g., around a table/desk). Thus, if the common reference point is visible, then each view of the device would be able to visualize the "center" of the 3D environment for perspective when viewing other user representations. The visualization of the common reference point may become more relevant with a multi-user communication session such that each user's view can add perspective to the location of each other user during the communication session.

In some implementations, the representations of each user may be realistic or unrealistic and/or may represent a current and/or prior appearance of a user. For example, a photorealistic representation of the user 10 may be generated based on a combination of live images and prior images of the user. The prior images may be used to generate portions of the representation for which live image data is not available (e.g., portions of a user's face that are not in view of a camera or sensor of the electronic device 10 or that may be obscured, for example, by a headset or otherwise). In one example, the electronic devices 10, 210, and 615 are HMDs and live image data of the user's face includes a downward facing camera that obtains images of the user's cheeks and mouth and inward facing camera images of the user's eyes, which may be combined with prior image data of the user's other portions of the users face, head, and torso that cannot be currently observed from the sensors of the device. Prior data regarding a user's appearance may be obtained at an earlier time during the communication session, during a prior use of the electronic device, during an enrollment process used to obtain sensor data of the user's appearance from multiple perspectives and/or conditions, or otherwise.

Some implementations provide a representation of at least a portion of a user within a 3D environment other than the user's physical environment during a communication session and, based on detecting a condition, provide a representation of another object of the user's physical environment to provide context. For example, during a communication session, representations of one or more other objects of the physical environment may be displayed in the view. For example, based on determining that the user 25 is interacting with a physical object in physical environment 100, a representation (e.g., realistic or proxy) may be displayed in a view to provide context for the interaction of the user 25. For example, if the first user 25 picks up an object, such as a family picture frame, to show to another user, a view may include a realistic view of the picture frame (e.g., live video). Thus, while displaying an XR environment, the view may present a virtual object that represents the user picking up a generic object, display a virtual object that is similar to a picture frame, display previous acquired image(s) of the actual picture frame from the obtained 3D scan, or the like.

Figure 7:
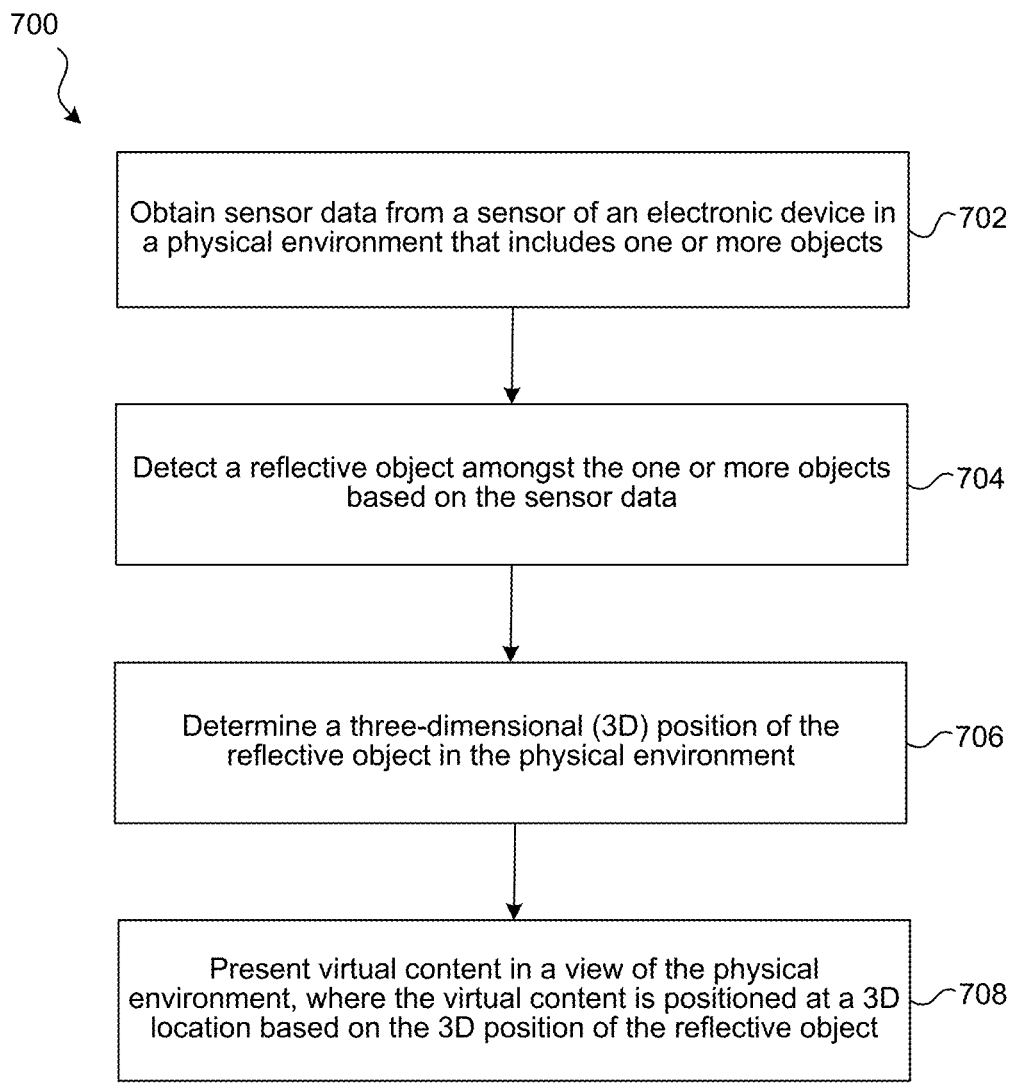
FIG. 7 is a flowchart representation of presenting virtual content at a three-dimensional (3D) location based on detecting and determining a 3D position of a mirror in a physical environment in accordance with some implementations.

FIG. 7 is a flowchart illustrating an exemplary method 700. In some implementations, a device such as device 10 (FIG. 1) performs the techniques of method 400 of presenting virtual content (e.g., an application) at a 3D location based on detecting and determining a 3D position of a mirror in a physical environment. In some implementations, the techniques of method 700 are performed on a mobile device, desktop, laptop, HMD, or server device. In some implementations, the method 700 is performed on processing logic, including hardware, firmware, software, or a combination thereof. In some implementations, the method 700 is performed on a processor executing code stored in a non-transitory computer-readable medium (e.g., a memory).

At block 702, the method 700 obtains sensor data (e.g., image data, sound data, motion data, etc.) from a sensor of an electronic device in a physical environment that includes one or more objects. For example, the electronic device may capture one or more images of the user's current room, depth data, and the like. In some implementations, the sensor data includes depth data and light intensity image data obtained during an image capture process.

In some implementations, obtaining sensor data (e.g., image, sound, motion, etc.) from the sensor of the electronic device in a physical environment includes tracking a gaze direction, and detecting that the gaze direction corresponds to the detected mirror of the physical environment. In some implementations, tracking the gaze of a user may include tracking which pixel the user's gaze is currently focused upon. For example, obtaining physiological data (e.g., eye gaze characteristic data 40) associated with a gaze of a user may involve obtaining images of the eye or electrooculography signal (EOG) data from which gaze direction and/or movement can be determined. In some implementations, the 3D environment may be an XR environment provided while a user wears a device such as an HMD. Additionally, the XR environment may be presented to the user where virtual images may be overlaid onto the live view of the physical environment. In some implementations, tracking the gaze of the user relative to the display includes tracking a pixel the user's gaze is currently focused upon.

At block 704, the method 700 detects a reflective object amongst the one or more objects based on the sensor data. For example, block 704 may include detecting a mirror or other reflective surface amongst one or more objects in a physical environment. For example, when a user wakes up in the morning to look at the mirror with his or her device (e.g., device 10), the system can detect a mirror based on one more mirror detection techniques. Mirror detection techniques may include detecting that a user is wearing the device as an HMD and standing in front of a mirror (e.g., based on the reflection, detecting the shape of the HMD, detecting LEDs on the HMD, and the like). Mirror detection may involve detecting a light source (e.g., LEDs around the frame of the mirror, IR LEDs behind the mirror) or some type of other marker on or proximately near the mirror (e.g., an augmented reality marker). Mirror detection techniques may include using facial detection regions over time, where a mirror can be detected by comparing the location and relative angle of the facial boundaries when wearing an HMD. A mirror can be detected based on object recognition using ML techniques. In some examples, detecting the mirror may include using facial detection regions over time, where a reflection can be detected by comparing the location and relative angle of the facial boundaries when wearing an HMD. Once it has been detected that a user is looking at a mirror, then the method 700 may determine whether the reflection is a mirror and detect the boundaries of the mirror based on shape analysis, edge detection, and/or the loss of the tracked facial recognition in the region.

In some implementations, detecting the mirror is based on detecting a mirror amongst one or more objects in the physical environment. For detecting the physical object of the mirror, in addition to edge finding and other purely visual or static techniques, the system may also utilize time-dependent techniques such as a visual inertial odometry (VIO) system, or the like. For example, a mirror may present similarly as a window into another space, and the edges of that window can be detected using relative parallax between the surface the mirror that it lies on and the reflective image within it. Additionally, or alternatively, in some implementations, detecting the physical object of the mirror can be detected using depth sensors (e.g., using an active time-of-flight sensor) to decipher the relative parallax between the surface the mirror that it lies on and the reflective image within it.

In some implementations, detecting the mirror may be based on non-geometric correlations. For example, a reflection of the electronic device may be detected as a sensed device, and the sensed device may be determined to be visually identical, or nearly identical, to the sensing device. For example, a tablet detecting an HMD would not infer a mirror. Additionally, or alternatively, a sensed face of a user may be determined to be visually similar to the face of the person holding the electronic device (e.g., wearing the HMD). Additionally, or alternatively, in some implementations, a likelihood of detecting a mirror may be determined by other sensing parameters of the general environment, such as plane detection techniques. For example, mirrors are likely to lie on or near and parallel to larger planes, such as walls.

In some implementations, detecting the mirror is based an object detection technique using machine learning (e.g., a neural network, decision tree, support vector machine, Bayesian network, or the like).

At block 706, the method 700 determines a 3D position of the reflective object in the physical environment. For example, the system determines a plane of the mirror, such as the boundaries of the mirror. The 3D mirror position may be determined based on comparing the reflected headset position over time versus headset position from motion data. Additionally, 3D mirror position may be determined based on sampling the mid-point between the reflected position and real headset's position and plane detection. Moreover, 3D mirror position may be determined based on checking if the reflected headset rotation is a mirrored rotation of the real headset by the calculated plane. This may further involve determining mirror boundaries (e.g., the bounding rectangles) based on techniques that detect differences between reflections and surfaces.

In some implementations, determining the 3D position of the mirror in the physical environment includes detecting a plane (and associated boundaries) of the mirror. For example, as illustrated in FIG. 1, the device 10 via sensors 60 and 65 may obtain image data (light intensity data and depth data) of the mirror 160, and determine a plane of the mirror 160 based on determining the outer edges of the mirror 160 and the 2D plane of the mirror 160.

In some implementations, determining the 3D position of the mirror in the physical environment includes detecting a reflection of the electronic device (e.g., an HMD) upon the mirror, determining 3D position data of the reflection of the electronic device during a first period of time, and determining the 3D position of the mirror based on comparing 3D location data of the electronic device and the 3D position data of the reflection of the electronic device during the first period of time. For example, techniques described herein can compare the reflected HMD position over time versus the HMD position from motion data (e.g., acquired via an IMU or the like).

In some implementations, determining the 3D position of the mirror in the physical environment includes detecting a reflection of the electronic device (HMD) upon the mirror, determining a 3D position of the reflection of the electronic device, and determining, based on the 3D position of the mirror, a mid-point location between the 3D position of the reflection of the electronic device and a 3D position of the electronic device. For example, techniques described herein can utilize sampling of location data of a mid-point between the reflected position of the device and the real device's position with respect to the detected plane of the device 160, and determine if the reflected rotation of the device (e.g., an HMD) is a mirrored rotation of the real device by the calculated plane of the mirror.

In some implementations, determining the 3D position of the mirror in the physical environment includes, in accordance with the electronic device rotating about a vertical axis during a second period of time, determining the 3D position of the mirror in the physical environment includes detecting a reflection of a rotation of the electronic device (e.g., an HMD) upon the mirror, determining 3D position data of the reflection of the rotation of the electronic device during the second period of time, and determining the 3D position of the mirror based on comparing 3D position data of the electronic device and the 3D position data of the reflection of the rotation of the electronic device during the second period of time. For example, techniques described herein can determine whether the reflected rotation of the device (e.g., an HMD) is a mirrored rotation of the real device by the calculated plane of the mirror. This may involve determining mirror boundaries (e.g., bounding rectangles) based on techniques that detect differences between reflections and surfaces.

In some implementations, the 3D position of the mirror is determined based on depth data from the sensor data and the 3D location of the virtual content is based on the depth data associated with the 3D position of the reflection. For example, the virtual content may be placed at the same depth as the mirror. In some examples, the depth can be detected by taking distance of the user's reflection as determined by a computer-vision technique and dividing by two. Additionally, or alternatively, a 3D location could also be at a virtual depth of the user in the mirror (e.g., depth determined by computer-vision).

In some implementations, determining the 3D position of the mirror is based on tracking a pose of the electronic device relative to the physical environment, and detecting, based on the pose of the electronic device, that a view of a display of the electronic device is oriented towards the virtual content. For example, position sensors may be utilized to acquire positioning information of the device (e.g., device 10). For the positioning information, some implementations include a VIO system to determine equivalent odometry information using sequential camera images (e.g., light intensity images such as RGB data) to estimate the distance traveled. Alternatively, some implementations of the present disclosure may include a SLAM system (e.g., position sensors). The SLAM system may include a multi-dimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device. For example, for 3D reconstruction algorithms, knowing there is a mirror will inform the SLAM system to be updated accordingly.

At block 708, the method 700 presents virtual content in a view of the physical environment, where the virtual content is positioned at a 3D location based on the 3D position of the reflective object (e.g., mirror). For example, in response to detecting that the user is in a situation in which the user would benefit from a particular UI, such as in the morning, virtual content, such as a calendar app, news, etc. may be provided. In other examples, a clothing app may be presented in response to determining that the user is looking at himself/herself or turning in a particular manner while wearing new clothes/hat. In other examples, if the user is acting a certain way (e.g., making particular hand gestures) or providing a verbal command, a social media video recording app may be presented. In other examples, if the user is determined to be in the gym, a fitness app may be displayed to track progress, provide exercise techniques, etc. In other examples, if the user is determined to be putting on makeup, etc., a zoomed in enhancement view of the face of the user may be provided. Additionally, the virtual content may be positioned on or based on a 3D position of the reflection (e.g., a position of the object with a reflective surface such as a mirror).

In some implementations, the virtual content includes one or more interactable elements that are presented on a detected plane of the mirror. For example, after detecting the plane of the mirror 160, the mirror plane and 3D location of the mirror plane may be used as touchscreen. For example, display interactable elements, such as augmented reality icons and/or applications that the user can select and/or interact with (e.g., virtual content 314, 316 of FIG. 3).

In some implementations, a depth position of the 3D location of the virtual content is the same as a depth of a reflected object detected in the mirror. For example, as illustrated in FIG. 4, the virtual content is an interactable element 416 (e.g., a button to select an exercise app or video) which appears to be at the same depth as the user's reflection 425 (e.g., on the same detected plane of the mirror 160). Presenting the virtual content on the same detected plane of the mirror or reflected surface allows the content to be displayed (e.g., the text) easier to see/read, etc., for a better visual experience for the user. In particular, positioning the virtual content at the same depth as the user's reflection 425 may advantageously prevent the user from having to change the focal plane of their eyes when looking from their reflection to the virtual content, or vice versa.

In some implementations, spatialized audio may be used in conjunction with or in lieu of presenting virtual content. In an exemplary implementation, the 3D position of the mirror includes a 3D location of the mirror that is at a first distance from the electronic device, the 3D location of the virtual content of the view of the physical environment is at a second distance from the electronic device that is greater than the first distance, and presenting the virtual content in the view of the physical environment includes presenting spatialized audio at a perceived distance to a sound source based on the 3D location of the virtual content. For example, as illustrated in FIG. 3, audio content 318 is spatialized audio that will be heard by the user as being "behind" the mirror. For example, based on the detected plane of the mirror 160, a perceived distance to a sound source may be implemented. In some implementations, the spatialized audio may be viewed within a virtual reflection. For example, a virtual application, such as a virtual avatar, may appear to be speaking from the 3D location of the reflection, not from the 3D location of the mirror (e.g., a reflection and the associated sound may appear to be at distance that is twice as far as the distance to the actual surface of the mirror).

In some implementations, physiological based tracking, such as skeleton tracking, may be used for instruction, evaluation, and feedback relating to posture, exercise, motion, clothing, etc. In an exemplary implementation, the sensor data includes physiological data of a user of the electronic device, and the method 700 further includes detecting movements of the user based on the physiological data, and modifying the virtual content in the view of the physical environment based on the detected movements of the user. For example, as illustrated in FIG. 4, the virtual icon 414 is presented to the user 25 after detecting that the user has an incorrect posture (e.g., standing while slouching, not smiling, etc.).

In some implementations, the method 700 further includes updating the virtual content based on detecting a change in the 3D position of the mirror. For example, techniques described herein can detect a mirror positional change and use the mirror positional change as input. For example, during a virtual chat session, a user can put a mirror face down to hang up if the mirror was a type of handheld mirror or mirror that can be moved.

In some implementations, the method 700 further includes detecting a reflection in the mirror amongst the one or more objects based on the sensor data. (e.g., based on facial recognition of the user, facial tracking/eye gaze detection, object detection via ML, etc.) In some implementations, detecting the reflection is based on a movement and attitude of the visually-sensed face of a user (or other object) that is correlated with the movement/attitude of the sensing device. For example, in cases where the user is looking at themselves in a reflection, bounding rectangles can be contained in a specific region and may not show rotation, even as the camera moves within space. For example, since the image sensors may be worn on the user's head, the user's face in the captured images will not show a change in orientation about a forward-facing axis despite rotation about the same axis by the electronic device. The detected rotation of the sensing device about an axis may include the vertical axis, the horizontal axis, or both. Detecting the reflection based on either axis may further include the relation of orientation as determined by visually-sensed face of a user (or other object) that is correlated with the movement/attitude of the sensing device.

In some implementations, detecting the reflection is based on tracking facial features of a user of the electronic device. In some implementations, detecting the reflection is based on facial recognition of a user of the electronic device. In some implementations, the sensor data includes images of a head of a user of the electronic device and detecting the mirror is based on determining that the head of the user is rotating in a yaw direction (e.g., about a vertical axis). For example, a mirror may be detected in response to seeing a face that does not rotate about a forward-facing axis and that rotates about a vertical axis by an amount that is double than what is determined for device 10 by onboard sensors (e.g., from a gyroscope).

In some implementations, the sensor data includes images of a head of a user of the electronic device and presenting the virtual content in the view of the physical environment includes presenting a virtual representation (e.g., an avatar) of the user at a 3D location associated with a reflection of the head of the user upon the mirror. For example, as illustrated in FIG. 5, the user representation 525 is presented as the virtual content over body and face of the user (e.g., an emoji, memoji, or animoji, such as a wolf face and an associated body). Other techniques may be used to present virtual content only over the face of a user (e.g., only presenting a wolf face avatar, but still showing the hands, body, etc., of the user in the reflection of the mirror).

In some implementations, if the reflective surface is not entirely a reflective surface (e.g., a window), additional visual techniques can be utilized to help detect the reflection. For example, a machine learning model can be trained to recognize the characteristic double-images of a reflection superimposed on the real world.

In some implementations, the method 700 further includes determining a context associated with the use of the device electronic device in the physical environment based on the sensor data, and presenting the virtual content based on the context. For example, determining the context may include detecting that the user is in a situation in which the user would benefit from presenting virtual content (e.g., a particular app), such as a time of day, trying on new clothes, putting on makeup, etc. Various ways of detecting context of a physical environment may be used by method 700. In some implementations, detecting the context includes determining use of the electronic device in a new location (e.g., using a mirror in a hotel room the user has not been to previously). In some implementations, detecting the context includes determining use of the electronic device during a type of activity (e.g., exercising, putting on makeup, trying on new clothes, etc.). In some implementations, detecting the context includes determining that the electronic device is within a proximity threshold distance of a location, an object, another electronic device, or a person.

In some implementations, the context includes a time of day, and presenting the virtual content is based on the time of day. For example, as illustrated in FIG. 3, the context includes a situation in which the user would benefit from a particular UI, such as in the morning, and virtual content, such as a calendar app, news app, and the like, may be presented such that it appears on the surface of the mirror as an application window.

In some implementations, the context includes movements of a user of the electronic device with respect to the mirror, and presenting the virtual content is based on the movements of the user. For example, as illustrated in FIG. 4, if the user is looking at himself or herself, or turning a particular manner with incorrect posture, the virtual content may include an exercise app.

In some implementations, the context includes a user interaction with the mirror, and presenting the virtual content is based on the user interaction with the mirror. For example, the context may include touching the mirror at a location of the virtual content, swiping action on the mirror to close a window/application, a verbal command, etc., to activate and/or interact with a particular app.

In some implementations, the virtual content (e.g., virtual content 314, 316 of FIG. 3) can be modified over time based on proximity of the electronic device to an anchored location (e.g., mirror 160). For example, as the user 25 gets closer, spatialized audio notifications (e.g., audio content 318) may indicate the closer proximity. Additionally, or alternatively, for a visual icon, the virtual content may increase in size or start flashing if the user starts to walk in a different direction away from the mirror 160. Additionally, the virtual content may include a text widget application that tells the user a location of an object displayed within the reflections of the mirror (or any reflective surface of an object).

In some examples, method 700 may further include capturing an image of the user in response to detecting the mirror. For example, an image may be captured once a day to allow the user to track their appearance over time. In other examples, activity data of the user may be recorded in response to detecting a reflection. For example, if it is determined that the user is at the gym or performing a workout in front of a mirror, the electronic device 10 may record a duration of the workout or number of calories burned.

In some implementations, method 700 may further include using the mirror for a multi-user communication session. In an exemplary implementation, the virtual content includes a visual representation of another user based on a communication session with another electronic device. For example, as illustrated in FIG. 6, a representation 606 of the user 604 (e.g., a wolf avatar) is presented in the reflection of the representation 660 of the mirror 160. In some examples, method 700 may further include a self-presentation mode for presenting virtual content for a user to use a mirror to see what his or her self-presentation may look like to others in an XR environment (e.g., during a communication session as illustrated in FIG. 6). For example, if a user wants reveal information publicly to other XR users (e.g., a "nametag" or other identifying information), then after detecting a reflective surface, the user can initiate the self-presentation mode to view the self-identifying virtual content.

In some examples, method 700 may further include a privacy setting mode based on determining that no other person is present (or may be triggered by the user themselves). In an exemplary implementation, techniques may include determining a scene understanding of the physical environment based on the sensor data, determining, based on the scene understanding, that a user of the electronic device is the only user within an area associated with the view of the physical environment, and presenting the virtual content based on a user preference setting associated with the user being the only user within the area associated with the view of the physical environment. For example, a user may only want the morning routine applications to open in the bathroom (e.g., virtual content 314 and virtual content 316 of FIG. 3) if he or she is the only person currently in the bathroom (e.g., a partner of user 25 may also be in the same room).

Figure 8:
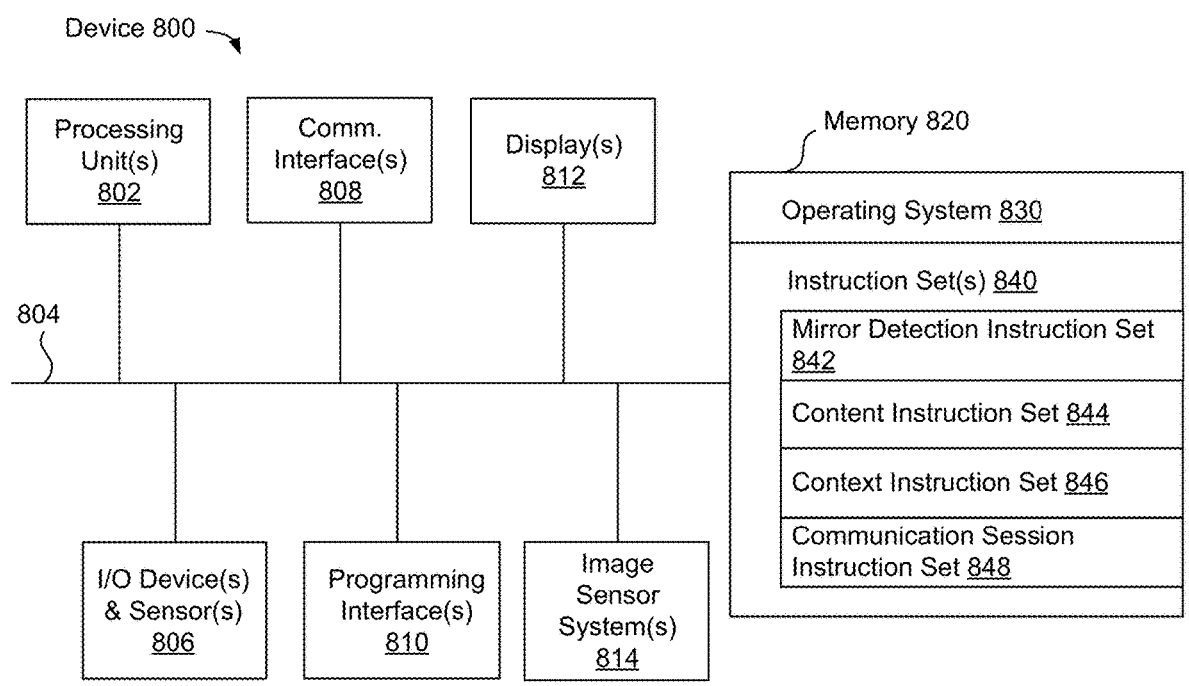
FIG. 8 illustrates device components of an exemplary device according to some implementations.

FIG. 8 is a block diagram of an example device 800. Device 800 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 10 includes a single display. In another example, the device 10 includes a display for each eye of the user.

In some implementations, the one or more image sensor systems 814 are configured to obtain image data that corresponds to at least a portion of the physical environment 100. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include a mirror detection instruction set 842, a content instruction set 844, a context instruction set 846, and a communication session instruction set 848. The instruction set(s) 840 may be embodied a single software executable or multiple software executables.

In some implementations, the mirror detection instruction set 842 is executable by the processing unit(s) 802 to detect a mirror in a physical environment amongst one or more objects based on the sensor data. The mirror detection instruction set 842 may be configured to determine a 3D position of the mirror in the physical environment (e.g., where the plane of the mirror is). To these ends, in various implementations, the instruction includes instructions and/or logic therefor, and heuristics and metadata therefor.

In some implementations, the content instruction set 844 is executable by the processing unit(s) 802 to provide and/or track content for display on a device. The content instruction set 844 may be configured to monitor and track the content over time (e.g., while viewing an XR environment), and generate and display virtual content (e.g., an application associated with the determined 3D position of a mirror). To these ends, in various implementations, the instruction includes instructions and/or logic therefor, and heuristics and metadata therefor.

In some implementations, the context instruction set 846 is executable by the processing unit(s) 802 to determine a context associated with a use of the electronic device (e.g., device 10) in the physical environment (e.g., physical environment 100) using one or more of the techniques discussed herein or as otherwise may be appropriate. To these ends, in various implementations, the instruction includes instructions and/or logic therefor, and heuristics and metadata therefor.

In some implementations, the communication session instruction set 848 is executable by the processing unit(s) 802 to facilitate a communication session between two or more electronic devices (e.g., device 10 and device 615 as illustrated in FIG. 6) using one or more of the techniques discussed herein or as otherwise may be appropriate. To these ends, in various implementations, the instruction includes instructions and/or logic therefor, and heuristics and metadata therefor.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 9:
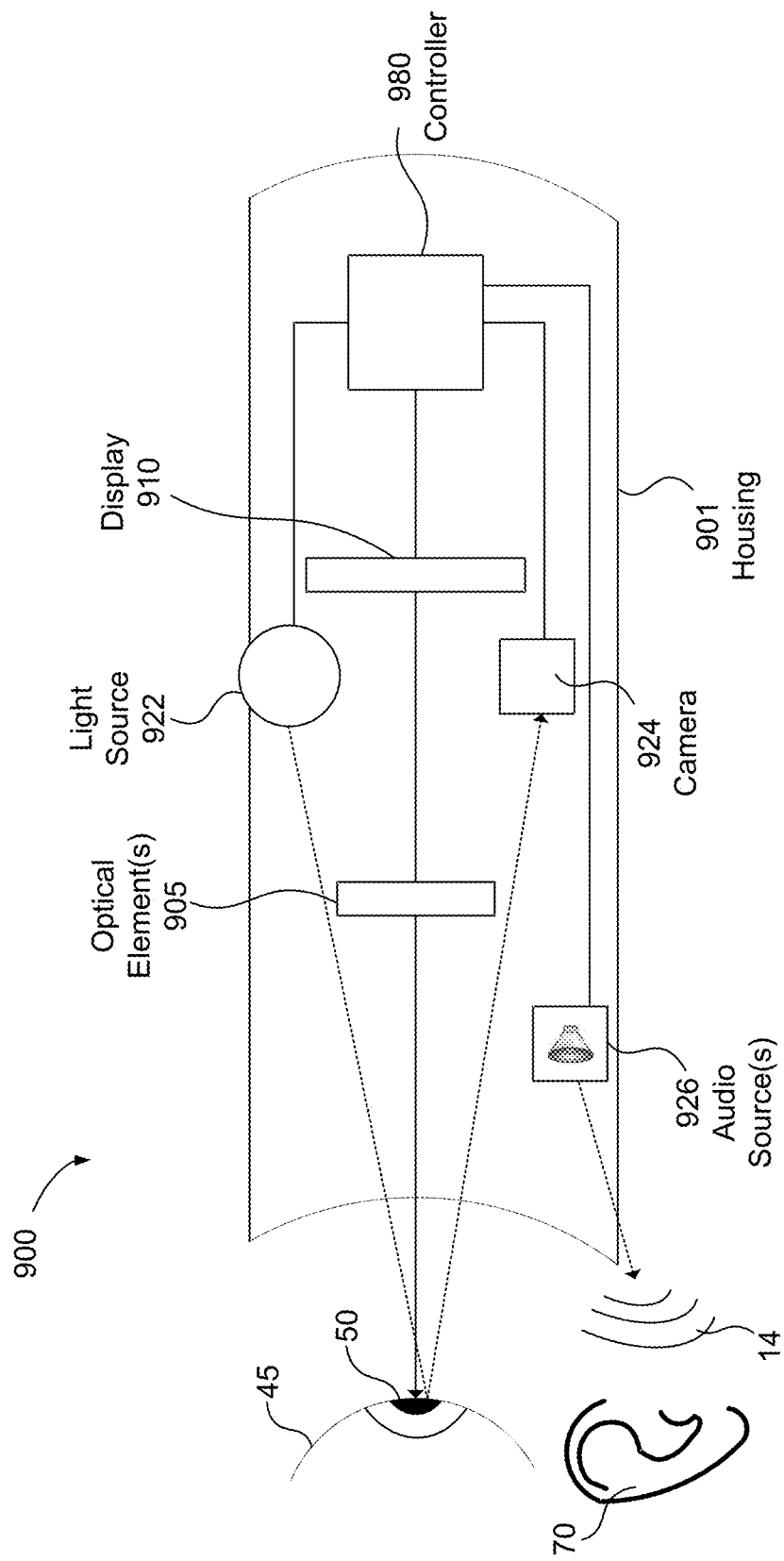
FIG. 9 illustrates an example of an HMD in accordance with some implementations.

FIG. 9 illustrates a block diagram of an exemplary head-mounted device 900 in accordance with some implementations. The head-mounted device 900 includes a housing 901 (or enclosure) that houses various components of the head-mounted device 900. The housing 901 includes (or is coupled to) an eye pad (not shown) disposed at a proximal (to the user 25) end of the housing 901. In various implementations, the eye pad is a plastic or rubber piece that comfortably and snugly keeps the head-mounted device 900 in the proper position on the face of the user 25 (e.g., surrounding the eye 45 of the user 25).

The housing 901 houses a display 910 that displays an image, emitting light towards or onto the eye of a user 25. In various implementations, the display 910 emits the light through an eyepiece having one or more optical elements 905 that refracts the light emitted by the display 910, making the display appear to the user 25 to be at a virtual distance farther than the actual distance from the eye to the display 910. For example, optical element(s) 905 may include one or more lenses, a waveguide, other diffraction optical elements (DOE), and the like. For the user 25 to be able to focus on the display 910, in various implementations, the virtual distance is at least greater than a minimum focal distance of the eye (e.g., 6 cm). Further, in order to provide a better user experience, in various implementations, the virtual distance is greater than 1 meter.

The housing 901 also houses an eye/gaze tracking system including one or more light sources 922, camera 924, and a controller 980. The one or more light sources 922 emit light onto the eye of the user 25 that reflects as a light pattern (e.g., a circle of glints) that can be detected by the camera 924. Based on the light pattern, the controller 980 can determine an eye tracking characteristic of the user 25. For example, the controller 980 can determine a gaze direction and/or a blinking state (eyes open or eyes closed) of the user 25. As another example, the controller 980 can determine a pupil center, a pupil size, or a point of regard. Thus, in various implementations, the light is emitted by the one or more light sources 922, reflects off the eye 45 of the user 25, and is detected by the camera 924. In various implementations, the light from the eye 45 of the user 25 is reflected off a hot mirror or passed through an eyepiece before reaching the camera 924.

The housing 901 also houses an audio system that includes one or more audio source(s) 926 that the controller 980 can utilize for providing audio to the user ears 70 via sound waves 14 per the techniques described herein. For example, audio source(s) 926 can provide sound for both background sound and the auditory stimulus that can be presented spatially in a 3D coordinate system. The audio source(s) 926 can include a speaker, a connection to an external speaker system such as headphones, or an external speaker connected via a wireless connection.

The display 910 emits light in a first wavelength range and the one or more light sources 922 emit light in a second wavelength range. Similarly, the camera 924 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 910 by looking at it), provide foveated rendering (e.g., present a higher resolution in an area of the display 910 the user 25 is looking at and a lower resolution elsewhere on the display 910), or correct distortions (e.g., for images to be provided on the display 910).

In various implementations, the one or more light sources 922 emit light towards the eye of the user 25 which reflects in the form of a plurality of glints.

In various implementations, the camera 924 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 924 is an event camera including a plurality of light sensors (e.g., a matrix of light sensors) at a plurality of respective locations that, in response to a particular light sensor detecting a change in intensity of light, generates an event message indicating a particular location of the particular light sensor.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at an electronic device having a processor and a sensor:
obtaining sensor data from the sensor of the electronic device in a physical environment that includes one or more objects;
detecting a reflection of a first object of the one or more objects upon a reflective surface of a reflective object based on the sensor data;
determining a three-dimensional (3D) position of the reflective object in the physical environment based on determining a 3D position of the reflection of the first object and determining a first distance to the reflection of the first object from the electronic device; and
presenting virtual content and spatialized audio content within a view of an extended reality (XR) environment that includes a view of the physical environment, wherein the virtual content is positioned at a 3D location within the view of the XR environment based on the determined 3D position of the reflective object in the physical environment, wherein the 3D location of the virtual content is at a second distance from the electronic device that is greater than the first distance, and wherein the spatialized audio content is presented at a perceived distance to a sound source based on the 3D location of the virtual content within the view of the XR environment.

2. The method of claim 1, wherein determining the 3D position of the reflective object in the physical environment comprises detecting a plane of the surface of the reflective object, and wherein the virtual content comprises one or more interactable elements that are presented on the detected plane of the surface of the reflective object.

3. The method of claim 1, wherein determining the 3D position of the reflective object in the physical environment comprises determining a mid-point location between the 3D position of the reflection of the first object and a 3D position of the first object.

4. The method of claim 1, wherein, in accordance with the electronic device rotating about a vertical axis during a first period of time, determining the 3D position of the reflective object in the physical environment comprises:
detecting a reflection of a rotation of the first object upon the reflective surface of the reflective object;
determining 3D position data of the reflection of the rotation of the first object during the first period of time; and
determining the 3D position of the reflective object based on comparing 3D position data of the first object and the 3D position data of the reflection of the rotation of the first object during the first period of time.

5. The method of claim 1, wherein the determined 3D position of the reflective object in the physical environment is determined based on depth data from the sensor data and the 3D location of the virtual content within the view of the XR environment is based on the depth data associated with the 3D position of the reflective object.

6. The method of claim 1, wherein the sensor data comprises images of a head of a user of the electronic device, and wherein detecting the reflective surface of the reflective object is based on determining that:
the head of the user as seen in the images is rotating about a vertical axis by an amount that is double an amount of rotation of the electronic device; or
the head of the user as seen in the images is not rotating about a forward axis.

7. The method of claim 1, further comprising:
detecting a facial reflection in the reflective object amongst the one or more objects based on the sensor data, wherein detecting the facial reflection is based on tracking facial features of a user of the electronic device or facial recognition of the user.

8. The method of claim 1, further comprising:
in accordance with detecting the reflective surface of the reflective object,
determining a context associated with a use of the electronic device in the physical environment based on the sensor data, and
presenting the virtual content within the view of the XR environment based on the context.

9. The method of claim 8, wherein:
the context comprises a time of day, and presenting the virtual content within the view of the XR environment is based on the time of day;
the context comprises movements of a user of the electronic device with respect to a reflection on the surface of the reflective object, and presenting the virtual content within the view of the XR environment is based on the movements of the user; or
the context comprises a user interaction with the reflection, and presenting the virtual content within the view of the XR environment is based on the user interaction with the reflection.

10. The method of claim 8, wherein determining the context comprises:
determining use of the electronic device in a new location;
determining use of the electronic device during a type of activity; or
determining that the electronic device is within a proximity threshold distance of a location, an object, another electronic device, or a person.

11. The method of claim 1, further comprising:
determining a scene understanding of the physical environment based on the sensor data;
determining, based on the scene understanding, that a user of the electronic device is an only user within an area associated with the view of the XR environment; and
presenting the virtual content within the view of the XR environment based on a user preference setting associated with the user being the only user within the area associated with the view of the physical environment.

12. The method of claim 1, wherein the virtual content comprises a visual representation of another user based on a communication session with another electronic device.

13. The method of claim 1, wherein a depth position of the 3D location of the virtual content within the view of the XR environment is the same as a depth of the detected reflection of the first object.

14. The method of claim 1, wherein the electronic device is a head-mounted device (HMD).

15. A device comprising:
a sensor;
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
  obtaining sensor data from the sensor of the device in a physical environment that includes one or more objects;
  detecting a reflection of a first object of the one or more objects upon a reflective surface of a reflective object based on the sensor data;
  determining a three-dimensional (3D) position of the reflective object in the physical environment based on determining a 3D position of the reflection of the first object and determining a first distance to the reflection of the first object from the device; and
  presenting virtual content and spatialized audio content within a view of an extended reality (XR) environment that includes a view of the physical environment, wherein the virtual content is positioned at a 3D location within the view of the XR environment based on the determined 3D position of the reflective object in the physical environment, wherein the 3D location of the virtual content is at a second distance from the electronic device that is greater than the first distance, and wherein the spatialized audio content is presented at a perceived distance to a sound source based on the 3D location of the virtual content within the view of the XR environment.

16. The device of claim 15, wherein determining the 3D position of the reflective object in the physical environment comprises detecting a plane of the surface of the reflective object, and wherein the virtual content comprises one or more interactable elements that are presented on the detected plane of the surface of the reflective object.

17. The device of claim 15, wherein determining the 3D position of the reflective object in the physical environment comprises determining a mid-point location between the 3D position of the reflection of the first object and a 3D position of the first object.

18. The device of claim 15, wherein the sensor data comprises images of a head of a user of the device, and wherein detecting the reflective surface of the reflective object is based on determining that:
  the head of the user as seen in the images is rotating about a vertical axis by an amount that is double an amount of rotation of the device; or
  the head of the user as seen in the images is not rotating about a forward axis.

19. A non-transitory computer-readable storage medium, storing computer-executable program instructions on a device to perform operations comprising:
  obtaining sensor data from the sensor of the device in a physical environment that includes one or more objects;
  detecting a reflection of a first object of the one or more objects upon a reflective surface of a reflective object based on the sensor data;
  determining a three-dimensional (3D) position of the reflective object in the physical environment based on determining a 3D position of the reflection of the first object and determining a first distance to the reflection of the first object from the device; and
  presenting virtual content and spatialized audio content within a view of an extended reality (XR) environment that includes a view of the physical environment, wherein the virtual content is positioned at a 3D location within the view of the XR environment based on the determined 3D position of the reflective object in the physical environment, wherein the 3D location of the virtual content is at a second distance from the electronic device that is greater than the first distance, and wherein the spatialized audio content is presented at a perceived distance to a sound source based on the 3D location of the virtual content within the view of the XR environment.

* * * * *